(12) United States Patent
Inada

(10) Patent No.: US 7,164,627 B2
(45) Date of Patent: Jan. 16, 2007

(54) OPTICAL PICKUP ACTUATOR CIRCUIT HAVING COIL PROTECTION FEATURE

(75) Inventor: Tsutomu Inada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 236 days.

(21) Appl. No.: 10/066,885

(22) Filed: Feb. 4, 2002

(65) Prior Publication Data

US 2002/0118612 A1    Aug. 29, 2002

(30) Foreign Application Priority Data

Feb. 5, 2001    (JP)    ............ P.2001-028132

(51) Int. Cl.
  *G11B 7/00* (2006.01)
(52) U.S. Cl. .................. 369/44.25; 369/44.29
(58) Field of Classification Search ............ 369/44.29, 369/44.35, 44.36, 44.14, 44.25
  See application file for complete search history.

(56) References Cited

U.S. PATENT DOCUMENTS

| | | | | |
|---|---|---|---|---|
| 4,688,202 A | * | 8/1987 | Mukai et al. | ............ 369/44.32 |
| 5,029,151 A | * | 7/1991 | Shikichi | .................. 369/44.35 |
| 5,097,361 A | * | 3/1992 | Childers et al. | ............ 359/824 |
| 5,189,638 A | * | 2/1993 | Kimura | ........................ 365/52 |
| 5,210,732 A | * | 5/1993 | Suenaga et al. | ......... 369/44.29 |
| 5,278,818 A | * | 1/1994 | Zucker et al. | ............... 369/146 |
| 5,687,154 A | * | 11/1997 | Tsuchiya et al. | ......... 369/44.23 |

FOREIGN PATENT DOCUMENTS

| | | | |
|---|---|---|---|
| JP | 58178676 A | * | 10/1983 |
| JP | 4-23235 | | 1/1992 |
| JP | 9-237428 | | 9/1997 |

OTHER PUBLICATIONS

Machine translation of Japanese Patent Application Laid-Open No. 09-237428.*
Japanese Patent Abstract; Publication No. 09-237428; published on Dec. 9, 1997.
Japanese Patent Abstract; Publication No. 04-023235; published on Jan. 27, 1992.

* cited by examiner

*Primary Examiner*—Brian E. Miller
*Assistant Examiner*—Peter Vincent Agustin
(74) *Attorney, Agent, or Firm*—Osha Liang LLP

(57) ABSTRACT

An optical pickup actuator circuit includes: a lens holder 2 supported so as to be slidable along a support shaft and rotatable around the support shaft and for holding an objective lens 8 so that the objective lens 8 forms an image of a light beam on a desired track on an information recording surface of an optical disk; a focusing coil 7 attached to the lens holder 2; and a focusing magnet fixedly disposed so as to be opposite to the focusing coil 7; wherein two diodes D1 and D2 are parallel-connected in a forward direction between an input end 7a of the focusing coil 7 and the ground so that an input voltage not lower than a predetermined voltage is led to the ground by the two diodes D1 and D2.

5 Claims, 3 Drawing Sheets

PRIOR ART

OPTICAL PICKUP ACTUATOR CIRCUIT HAVING COIL PROTECTION FEATURE

BACKGROUND OF THE INVENTION

1. Field of the Invention

The present invention relates to an optical disk device for recording information on an optical disk such as a compact disc (CD) or a CD-ROM or for reproducing recorded information from the optical disk, and particularly to an optical pickup actuator circuit for forming an optical pickup for recording/reproducing information.

2. Description of the Related Art

An actuator circuit including a coil and a magnet for focusing or tracking control is generally used in an optical pickup of an optical disk device.

As an example of the optical disk device having such an optical pickup actuator circuit, there has been proposed a biaxial actuator aimed at performing proper signal reproduction (Japanese Patent Application Laid-Open No. 9-237428).

The biaxial actuator is structured such that an objective lens holder of an optical pickup holds objective lenses respectively corresponding to a plurality of different-form optical disks at different angular positions on one and the same circumference with respect to a support shaft. The lens holder is rotated around the support shaft by interaction between a tracking coil and a tracking magnet so that one of the objective lenses is inserted into an optical path.

Hence, an image of a light beam from a light source is formed correctly on a signal recording surface of an optical disk through the objective lens. Then, a return beam from the signal recording surface of the optical disk correctly enters a photo-detector. In this manner, signal reproduction optimal to each of the different-form optical disks is performed.

There is also known an optical disk device aimed at solving a problem that the device is damaged mechanically by the malfunction of a focusing servo operation portion (Japanese Patent Application Laid-Open No. 4-23235).

The optical disk device is structured such that, when abnormality occurs in rotation of an optical disk, the tracking operation of the focusing servo is stopped to prevent a laser beam from being focused onto an optical disk surface before the laser output is reduced or stopped to thereby protect the optical disk optically and mechanically.

Incidentally, in any one of the related-art optical disk devices, the focusing and tracking coils are disposed on the lens holder for holding the objective lenses. It is therefore impossible to avoid such a problem that the focusing and tracking coils may be burned out by an abnormal voltage so that the disk device becomes disabled.

That is, in the case of a focusing coil, as shown in FIG. 6, the focusing coil 7 has one input end 7a connected to a positive pole terminal 15a of a focusing operation portion 15, and the other input end 7b connected to a negative pole terminal 15b of the focusing operation portion 15.

The focusing operation portion 15 is connected to a disk drive controller 11 through a focusing and tracking servo circuit 12.

The disk drive controller 11 sends a control signal to the focusing and tracking servo circuit 12 in accordance with a command signal at the time of reproduction. The focusing and tracking servo circuit applies, for example, 0.7 V as an operating voltage to the focusing operation portion 15.

Accordingly, the signal voltage is applied across the opposite ends of the focusing coil 7, so that an operation signal of 0.7 V is led from one input end 7a to the other input end 7b.

Hence, an objective lens is operated so as to move vertically in the optical path, and an image of a light beam from the light source is formed on a desired track of a signal recording surface of the optical disk through the objective lens.

In such an optical pickup actuator circuit, however, an abnormal voltage maybe input to the focusing operation portion 15 at the time of the focusing operation because of short-circuit due to bad soldering of a wiring substrate or other causes.

If such an abnormal voltage is applied across the opposite ends of the focusing coil, the focusing coil may be broken due to burning out to make the objective lens inoperative. Indeed, there was such a disadvantage that recorded information could not be reproduced.

Such breaking of the focusing coil could be found only in a test performed after production. Hence, there was a disadvantage that the efficiency of producing the optical disk devices was lowered greatly.

SUMMARY OF THE INVENTION

The invention has been effected in consideration of the problems. It is an object of the invention to provide an optical pickup actuator circuit of an optical disk device to which a semiconductor device is additionally provided in a simple configuration so that the problem that the efficiency of producing optical disk devices is lowered by burning-out of focusing coils due to an abnormal voltage can be solved.

In order to achieve the object, according to the invention, there is provided an optical pickup actuator circuit including: a lens holder supported so as to be slidable along a support shaft and rotatable around the support shaft and for holding an objective lens so that the lens forms an image of a light beam on a desired track on an information recording surface of an optical disk; a focusing coil attached to the lens holder; and a focusing magnet fixedly disposed so as to be opposite to the focusing coil; wherein two diodes are parallel-connected in a forward direction between an input end of the focusing coil and a ground of the same so that an input voltage not lower than a predetermined voltage is led to the ground by the two diodes.

Further, according to the invention, there is provided an optical pickup actuator circuit including: a lens holder supported so as to be slidable along a support shaft and rotatable around the support shaft and for holding an objective lens so that the lens forms an image of a light beam on a desired track on an information recording surface of an optical disk; focusing and tracking coils attached to the lens holder; and focusing and tracking magnets fixedly disposed so as to be opposite to the focusing and tracking coils respectively; wherein a semiconductor device is provided at an input end of each of the coils so that an input voltage not lower than a predetermined voltage is led to a ground by the semiconductor device.

Further, according to the invention, the semiconductor device includes two diodes which are parallel-connected in a forward direction between an input end of the focusing coil and the ground of the same.

DETAILED DESCRIPTION OF THE PREFERRED EMBODIMENTS

An embodiment of the invention will be described below with reference to the illustrated drawings.

Figure 1:
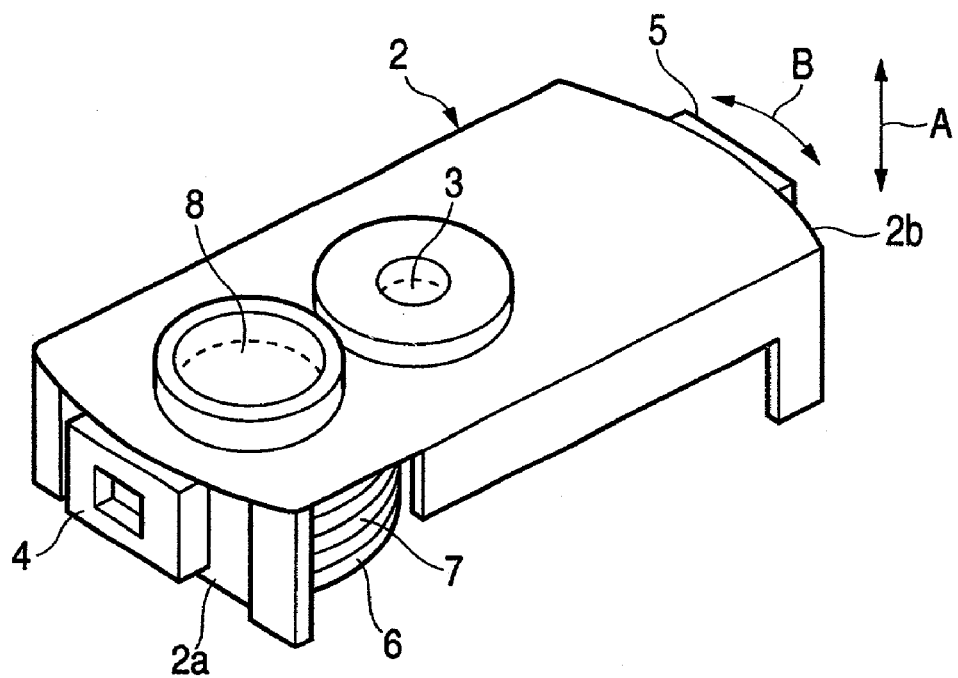
FIG. 1 is a perspective view showing a lens holder provided with an optical pickup actuator circuit according to an embodiment of the invention.

FIG. 1 is a perspective view showing a lens holder provided with an optical pickup actuator circuit according to an embodiment of the invention.

The optical pickup actuator circuit is provided in an optical disk device for recording/reproducing information in/from an optical disk.

Figure 2:
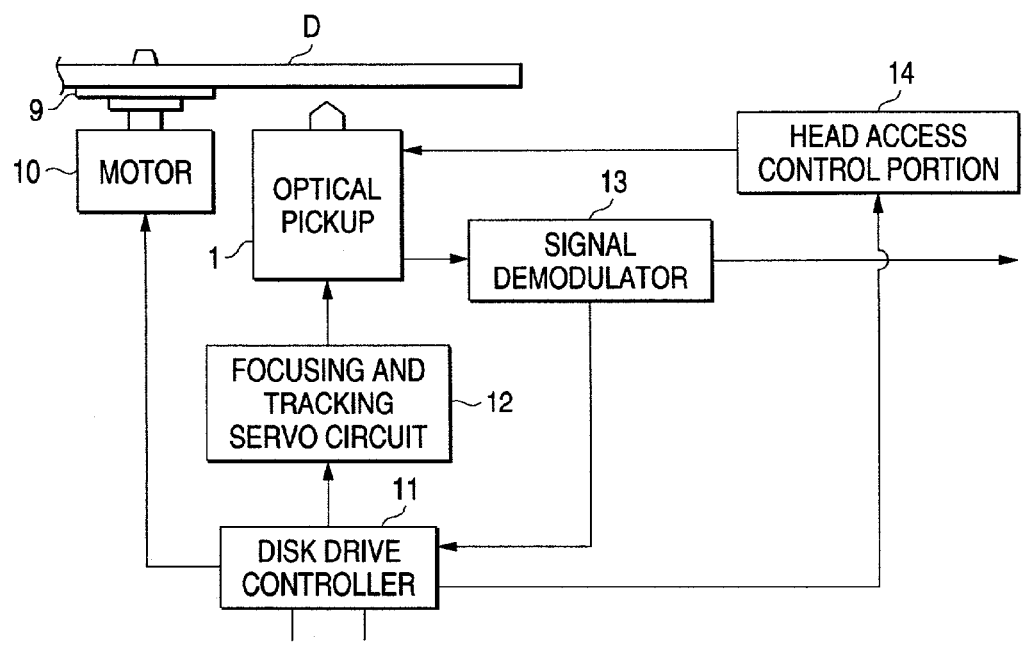
FIG. 2 is a block diagram showing the electrical configuration of a magneto-optical disk device.

In the optical disk device, in FIG. 2, an optical pickup 1 and a spindle motor 10 are provided on a turntable 9 on which an optical disk D is to be placed.

The optical pickup 1 has a lens holder 2 serving as a movable portion, and a base serving as a stationary portion. The lens holder 2 is supported so as to be freely movable relative to the base in directions indicated by arrows A and B. That is, the arrow A is a direction along which the lens holder 2 moves apart from or toward the desired track of the optical disk D, and the arrow B is a direction along which the lens holder 2 moves across the track.

The lens holder 2 has a shaft hole 3 formed substantially in the center, and a pair of tracking coils 4 and 5 disposed in outer surfaces 2a and 2b on the upper side. Further, a focusing coil 7 is wound on the outer circumference of a cylindrical portion 6 formed on the lower side. A support shaft not shown and projecting from the base is inserted through the shaft hole 3, and the lens holder 2 rotates around the support shaft as indicated by the arrow B and vertically slides along the support shaft as indicated by the arrow A.

Incidentally, a convex lens 8 serving as an objective lens (focusing lens) is provided in a through-hole which is formed in the cylindrical portion 6 so as to be located in the same direction as the shaft hole 3.

Though not shown, the base is shaped like a plate. A semiconductor laser as a light source, a grating as a light dividing unit, a beam splitter as a light splitting unit, a rising mirror as an optical path bending unit, a collimator lens and a photo-detector are provided on the base.

Further, a support frame is provided on the base so as to extend perpendicularly to the signal recording surface of the optical disk. Further, a tracking magnet having an integrated yoke and a focusing magnet having an integrated yoke are provided on the outer circumference of the support frame.

The tracking and focusing magnets are disposed so as to be opposite to the tracking coils 4 and 5 and the focusing coil 7, respectively.

The lens holder 2 is rotated around the support shaft as indicated by the arrow B by interaction between the tracking coils 4, 5 and the tracking magnets, so that the objective lens 8 is inserted in the optical path of the semiconductor laser.

Further, the objective lens 8 is freely movable in the axial direction of the support shaft as indicated by the arrow A, so that an image of a light beam emitted from the semiconductor laser is formed on a track on the signal recording surface of the rotating optical disk through the collimator lens.

With the image-forming, a return beam from the signal recording surface of the optical disk enters the photo-detector. In this manner, a signal optimal for the optical disk is reproduced.

FIG. 2 is a block diagram showing the electrical configuration of the optical disk device.

In FIG. 2, the turntable 9 is provided so that an optical disk is placed on the upper surface of the turntable 9. An output of the disk drive controller 11 is connected to the spindle motor 10. Upon reception of a control signal from the disk drive controller 11, the spindle motor 10 is driven to rotate to thereby make the rotary tray 9 rotate at a predetermined rotational speed.

Further, the output of the disk drive controller 11 is also connected to a focusing and tracking servo circuit 12 and a head access control portion 14. An output of a signal demodulator 13 is led to the disk drive controller 11.

The focusing and tracking servo circuit 12 is connected to the focusing coil 7 through the objective lens operation portion provided in the optical pickup 1 and to the tracking coils 4 and 5 through an objective lens driving portion not shown.

An output of the head access control portion 14 is connected to the optical pickup 1. Upon reception of a control signal from the disk drive controller 11, the head access control portion 14 makes the base of the optical pickup 1 move along a guide.

The output of the optical pickup 1 is also connected to the signal demodulator 13, so that the optical pickup 1 sends a reproduced signal of the return beam to the signal demodulator 13. The signal demodulator 13 is designed to demodulate the reproduced signal and sends the demodulated signal to the disk drive controller 11 and to an external computer through an error correction circuit and an interface circuit which are not shown.

Figure 3:
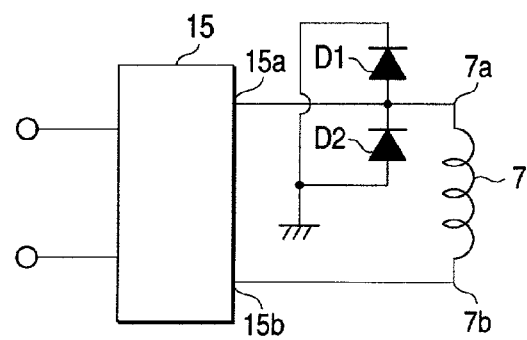
FIG. 3 is an electric circuit diagram showing a focusing coil in the optical pickup actuator circuit.

FIG. 3 is an electric circuit diagram showing the focusing coil 7 in the optical pickup actuator circuit.

In FIG. 3, one end 7a of the focusing coil 7 is connected to a positive pole terminal 15a of the focusing operation potion 15, while the other end 7b of the focusing coil 7 is connected to a negative pole terminal 15b of the focusing operation portion 15.

Figure 4:
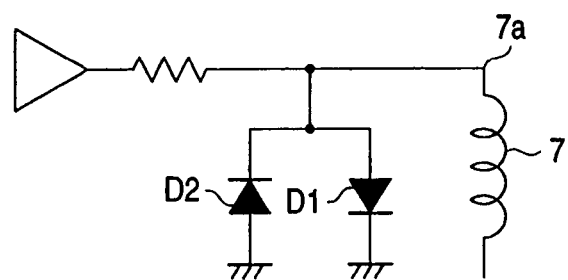
FIG. 4 is an equivalent circuit of the optical pickup actuator circuit shown in FIG. 3.

Further, two diodes D1 and D2 are parallel-connected in a forward direction between one end 7a and the ground. FIG. 4 shows its equivalent circuit.

Figure 5:
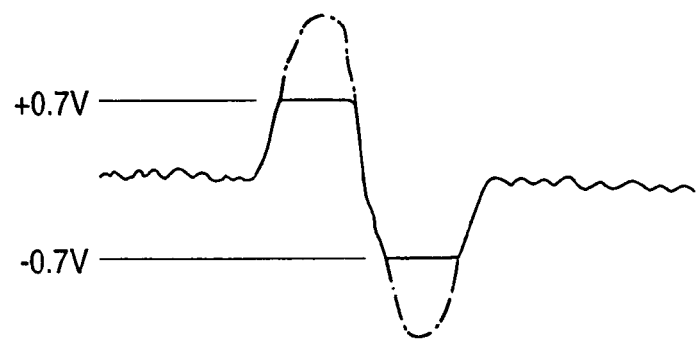
FIG. 5 is a waveform diagram showing an example of an operation voltage.
Figure 6:
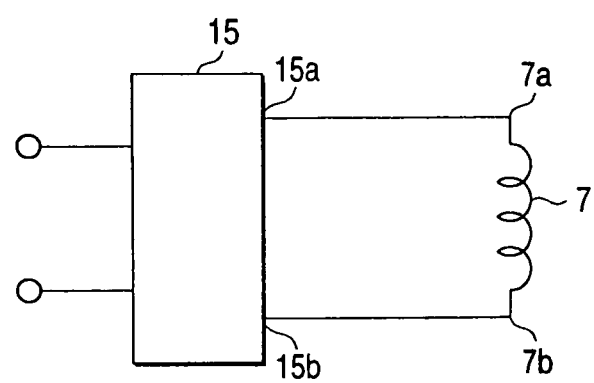
FIG. 6 is an electric circuit diagram showing a focusing coil in a related-art optical pickup actuator circuit.

In this embodiment, diodes with a rated voltage of 0.7 V are used as the diodes D1 and D2. When a voltage not lower than plus/minus 0.7 V is applied to the diodes D1 and D2 by the focusing operation portion 15, the diodes D1 and D2 operate to lead the overvoltage to the ground. That is, as shown in FIG. 5, the diodes D1 and D2 clamp a current at the time where a signal voltage from the terminal 15a exceeds 0.7 V in absolute value.

The optical disk device provided with the optical pickup actuator circuit is structured such that, if there is a reproducing command signal fed from a remote controller or the like at the state of use, the disk drive controller 11 feeds a control signal to the focusing and tracking servo circuit 12 in accordance with the reproducing command signal.

As a result, an image of the light beam from the light source is formed correctly on the signal recording surface of the optical disk through the objective lens 8. Further, a return beam from the signal recording surface of the optical disk enters the photo-detector, so that optimal signal reproduction is performed.

In the beginning or middle of such an operation, however, an abnormal voltage higher than the operating voltage (for example, 0.7 V in this embodiment) may be sent to the focusing operation portion 15.

The cause of the abnormal voltage may include short-circuit due to bad soldering of a wiring substrate on which various kinds of electronic parts are mounted. Further, the influence of other circuits may result in the operating voltage's being formed as a signal wave (as indicated by a dashed line in FIG. 5) with a large amplitude.

The signal wave appears as an output voltage not lower than 0.7 V, so that the output voltage is sent from the focusing operation portion 15 to the focusing coil 7.

On this occasion, the overvoltage not lower than plus 0.7 V is led to the ground by the diode D1 connected between the one end 7a and the ground, and a voltage not lower than minus 0.7 V is led to the ground side by the diode D2.

Hence, because the overvoltage not lower than 0.7 V in absolute value is never applied to the focusing coil 7, the coil 7 is protected from being burned out and broken due to the abnormal voltage.

Although the embodiment has been described upon the case where diodes are connected to the focusing coil 7 to protect the focusing coil 7, the invention may be applied also to the case where such diodes are connected between the tracking coils and the ground to prevent the coil from being burned out.

Also, diodes whose rated voltage is other than 0.7 V may be used instead, and when a breakdown voltage is increased, Zener diodes may be used.

As described above, in accordance with the invention, two diodes are parallel-connected between an end of a focusing coil and the ground so that an input voltage not lower than a predetermined voltage is applied to the ground. Hence, an abnormal voltage not lower than the predetermined voltage is never applied across the focusing coil, so that breaking of the focusing coil by the burning-out due to the abnormal voltage can be avoided. Accordingly, the invention has an effect in improving production efficiency of optical disk devices.

Further, according to the invention, a semiconductor device is provided at an input end of each of focusing and tracking coils so that an input voltage not lower than a predetermined voltage is led to the ground. Hence, an abnormal voltage not lower than the predetermined voltage is never applied to the coils, so that breaking of the coils by burning-out due to such an abnormal voltage can be avoided. Accordingly, the invention has an effect in improving production efficiency of magneto disk devices.

Further, according to the invention, each semiconductor device includes two diodes which are parallel-connected between an end of the focusing coil and the ground. Hence, the invention has an advantage in that protection of the optical pickup actuator circuit is attained by a simple configuration.

What is claimed is:

1. An optical pickup actuator circuit comprising:
   a lens holder supported so as to be slidable along a support shaft and rotatable around said support shaft and for holding an objective lens so that said lens forms an image of a light beam on a desired track on an information recording surface of an optical disk;
   a focusing coil attached to said lens holder; and
   a focusing magnet fixedly disposed so as to be opposite to said focusing coil; and
   two diodes, connected in parallel to an input line of said focusing coil so that an input voltage from a focusing operation portion not lower than a predetermined voltage is led to the ground by one of the two diodes.

2. The optical pickup actuator circuit according to claim 1, wherein said diodes comprise Zener diodes.

3. An optical pickup actuator circuit comprising:
   a lens holder supported so as to be slidable along a support shaft and rotatable around said support shaft and for holding an objective lens so that said lens forms an image of a light beam on a desired track on an information recording surface of an optical disk;
   focusing and tracking coils attached to said lens holder; and
   focusing and tracking magnets fixedly disposed so as to be opposite to said focusing and tracking coils respectively;
   wherein a semiconductor device is provided at an input line of each of said coils so that an input voltage from a focusing operation portion not lower than a predetermined voltage is led to a ground by said semiconductor device,
   wherein said semiconductor device comprises two diodes, each of which are connected in parallel to an input end of said focusing coil.

4. An optical pickup actuator circuit, comprising:
   a lens holder for an objective lens which is freely movable in a vertical direction that moves apart from or toward tracks of an optical disk and in a direction that moves across said tracks;
   focusing and tracking coils attached to said lens holder;
   focusing and tracking magnets fixedly disposed so as to be opposite to said focusing and tracking coils, respectively; and
   two diodes each connected in parallel to an input line of one of said focusing and tracking coils for leading an input voltage of a predetermined voltage or more from a focusing operation portion to a ground side.

5. The optical pickup actuator circuit according to claim 4, wherein said diodes comprise Zener diodes.

* * * * *